United States Patent [19]

Guevel et al.

[11] Patent Number: 4,964,756

[45] Date of Patent: Oct. 23, 1990

[54] TIDE ATTENUATOR

[75] Inventors: Pierre Guevel, Chateauneuf/Grasse; Eric Landel, Antibes, both of France; Jean-Michel Manzone, Monaco, Monaco; Réné Bouchet, Eze, France

[73] Assignee: Principia Recherche Developement S.A., France

[21] Appl. No.: 46,528

[22] Filed: May 4, 1987

Related U.S. Application Data

[63] Continuation of Ser. No. 799,360, Nov. 18, 1985, abandoned.

[30] Foreign Application Priority Data

Jan. 24, 1985 [FR] France .................. 85 01165

[51] Int. Cl.⁵ .............................................. E02B 3/06
[52] U.S. Cl. .................................... 405/26; 405/25
[58] Field of Search .............. 405/21, 23, 25, 26, 405/27, 28, 30–35

[56] References Cited

U.S. PATENT DOCUMENTS

| | | | |
|---|---|---|---|
| 3,022,632 | 2/1962 | Parks | 405/26 |
| 3,197,963 | 8/1965 | Frederikson | 405/25 |
| 3,846,990 | 11/1974 | Bowley | 405/26 |
| 3,848,419 | 11/1974 | Bowley | 405/26 |
| 4,006,598 | 2/1977 | Hulsemann | 405/25 |
| 4,098,086 | 7/1978 | Desty et al. | 405/26 |
| 4,264,233 | 4/1981 | McCambridge | 405/25 X |

FOREIGN PATENT DOCUMENTS

| | | | |
|---|---|---|---|
| 2216396 | 8/1974 | France . | |
| 470566 | 8/1975 | U.S.S.R. | 405/26 |
| 673689 | 9/1979 | U.S.S.R. | 405/28 |
| 914702 | 3/1982 | U.S.S.R. | 405/25 |

Primary Examiner—David H. Corbin
Attorney, Agent, or Firm—Marshall & Melhorn

[57] ABSTRACT

Process designed to produce attenuation of the effects of swell in view of protecting coastal or off-shore structures or installations, characterized in that it consists in creating, from the incident swell, an undulatory type phenomenon which is materialized in the form of a "oscillating wall of water" generating a system of radiation waves whose combination with the diffracted wave present downstream from said "oscillating wall of water", produces a non-existent or low amplitude resultant.

19 Claims, 8 Drawing Sheets

FIG.13

TIDE ATTENUATOR

This is a continuation of application Ser. No. 799,360, filed Nov. 18, 1985, now abandoned.

It is known that very numerous sectors of activity coming within the industries of the sea, would obtain great benefit from the existence of a swell attenuator contrivance fairly cheap to construct, only requiring a minimum amount of maintenance, resistant to bad weather conditions, not impeding the navigation of low tonnage vessels, and not affecting the aesthetic appearance of a site.

Amongst the possible applications of this contrivance may be mentioned as nonexhaustive examples:

the reduction of splashing in harbors and natural shelters the protection of dykes which are liable to show signs of fatigue the protection of off-shore installations (rigs of all types, immersed storage tanks, etc.)

improvement to the safety of operations at sea (hauling off of structures, assembly of prefabricated elements, recovery of oil slicks, etc.) and even possibly, recuperation of energy from the waves and swell.

A great number of systems have been already proposed tending to produce effects of this type. A practically exhaustive survey of the studies on this subject can notably be found in Report R 727 published in May 1971 by the United States Navy Department.

Nevertheless, the devices proposed until now make use of material elements generally involving damping effects of viscous origin whereas, swell being a periodical oscillatory type phenomenon, it would be more promising, to obtain attenuation, to use the means resulting from conventional mathematical computations of these undulatory phenomena. Now this is not the case, and the invention is precisely aimed at a completely new type of system, based on the notion of a phenomenon which will be identified under the name of "oscillating wall of water", and whose creation, based on theoretical computations of undulatory phenomenon of this type, obtains in practice the results required through material elements which are both simple, cheap and compact.

To facilitate the understanding of the invention, the theoretical bases on which it rests will be explained first with reference to the accompanying drawing in which.

DESCRIPTION OF THE OSCILLATING WALL OF WATER PHENOMENON:

Two possible cases can be considered, according to the depth of the water at the point of installation:

1st case: the depth of the water is shallow with respect to the wavelength of the incident swell.

Figure 1:
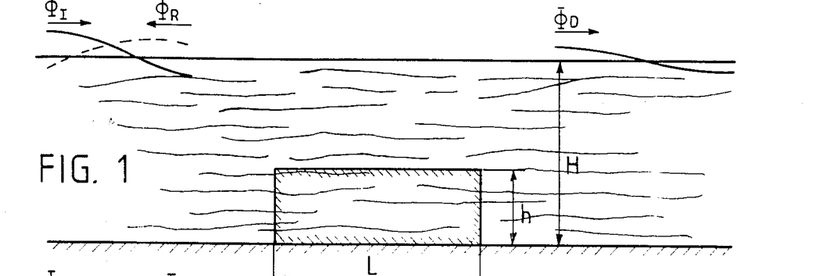
FIG. 1 is a diagrammatic side elevational view of a tank immersed at the bottom of the sea.

If we consider in this case a parallelepipedic tank, with a length L and height h, laid on the seabed, directed perpendicular to the incident swell $\Phi_I$; the system of distant waves consists of the incident swell $\Phi_I$, the reflected wave $\Phi_R$ and the wave diffracted by the tank $\Phi_D$. This is illustrated in FIG. 1 of the drawing appended.

If we now assume that any mechanical device, such as a hydraulic actuator (1) for example, draws the said tank in an alternative horizontal translation movement, with equation $X(t)=Ae^{iwt}$, to the above wave system, then a system of two waves of radiation $\Phi_r$ and $\Phi_r$, will be superposed, propagating on either side of the tank. This is illustrated of FIG. 2 in the drawing appended.

Figure 2:
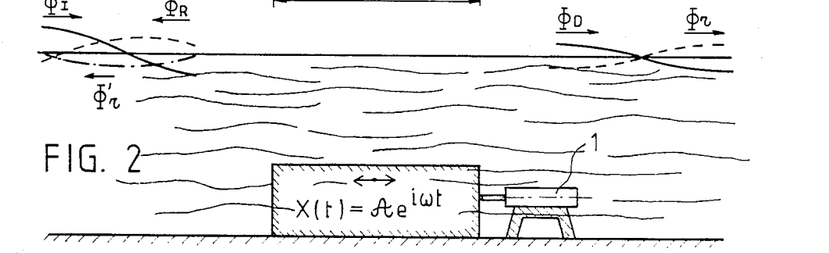
FIG. 2 is a view similar to FIG. 1 but additionally showing an arrangement for displacing the tank.

It is then clear that by correctly adjusting the amplitude A of the movement of the actuator (1), it will always be possible to make sure that $\Phi_R$ has the same amplitude as $\Phi_D$, whereas, by adjusting the phase of the alternative movement of the actuator, it will always be possible to force $\Phi_r$ to be in opposite phase with $\Phi_D$, at which moment at waves $\Phi_r$ and $\Phi_D$ destroy themselves mutually thus obtaining an ideal swell attenuator.

Figure 3:
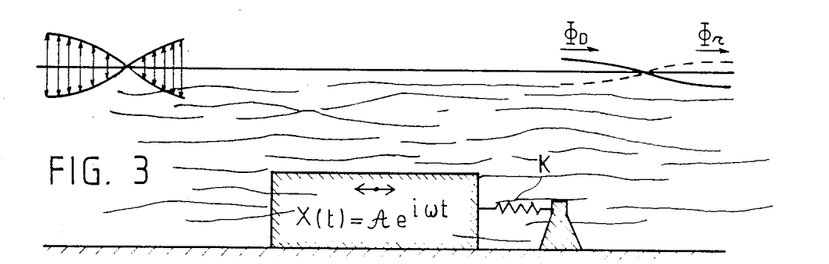
FIG. 3 is a view similar to FIG. 1 but additionally showing an actuating spring.

If we write from the mathematical angle based on the NEWTON equations which govern the movements of a solid under the effect of forces of inertia, hydrodynamic forces and related effects, it can be observed that there is always at least one swell period for which the device preserves its ideal attenuator qualities when the actuator (1) is replaced by a simple spring of stiffness K. In this case, a pure splashing phenomenon is then observed on the front of the tank, which is illustrated by FIG. 3.

Moreover, it is further possible to give a value M to the mass of the tank for which the K coefficient becomes nil At this moment an ideal swell attenuator has been obtained, with the tank, but without it being necessary to actuate this tank in any way.

Figure 4:
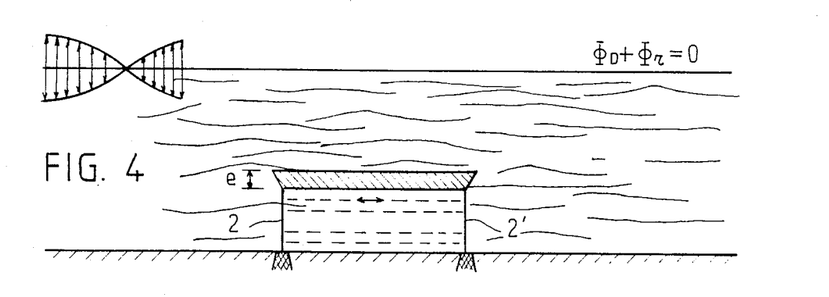
FIG. 4 is a view similar to FIG. 1 but showing a slab replacing the tank.

Finally, for the tank, if the height h is fixed, there is a width L for which the mass M in question is equal to the mass of the volume of water displaced. At this moment, the tank is simply equivalent to an envelope full of water, and which is only subjected to vertical forces. In these conditions, there is no disadvantage in eliminating the sidewalls of the tank, so that we thus produce an ideal swell attenuator, replacing the tank by a thin horizontal water impervious slab e, with slightly positive buoyancy, secured to taut cables 2, 2'.

In other words, and in theory, it is therefore possible to conceive an "ideal" swell attenuator, i.e. completely cancelling out incident swell, simply by a single slab of suitable size, immersed to the right depth, so that the slice of water defined under this slab then oscillates horizontally with the amplitude and phase required so that this attenuation is obtained. This is what is termed the oscillating wall of water phenomenon and which is illustrated in FIG. 4.

In practice, it is clear that the number and magnitude of the parameters involved in fact are such that one can only seek to obtain maximum attenuation efficiency, i.e. optimum, in given conditions, this efficiency being provided by the formula $$R = 1 - \frac{\text{energy transmitted}}{\text{incident energy}}$$

Figure 5:
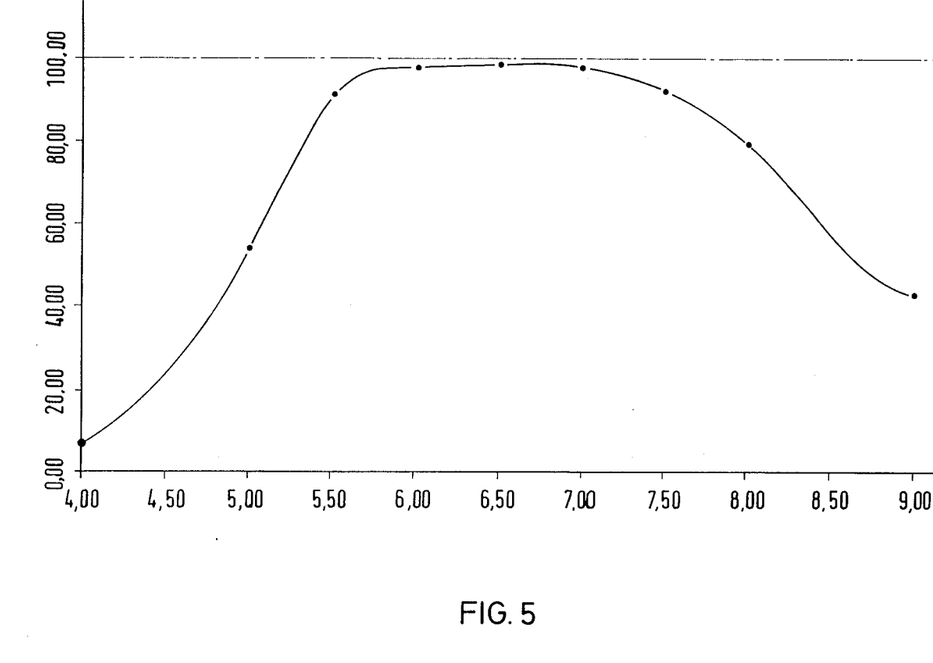
FIG. 5 is a graphic representation of the dependency of the wave suppression activity of the arrangement of FIG. 4 on the period of the waves.

We have thus been able to observe that, for example with a slab of length $L=12$ m and a thickness $e=0.24$ m, immersed at 1.5 m from the free surface in 11 m depth of water, the efficiency R in percentage, varies in dependence on the period of the swell, according to a graph shown on FIG. 5. It therefore appears that, in this first case, this efficiency is excellent over a broad range of frequencies.

2nd case: the depth of the water is great versus the wavelength of the incident swells.

Figure 6:
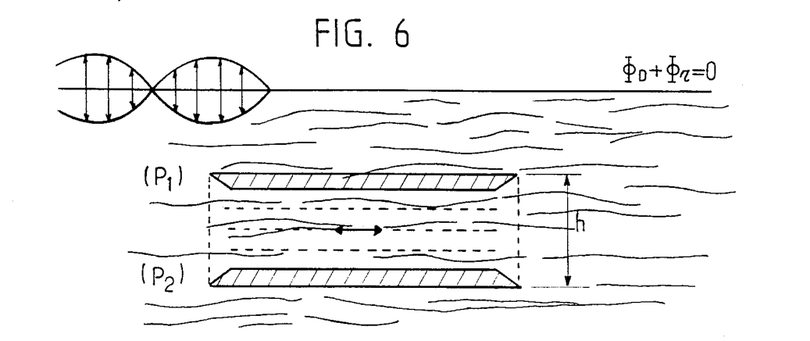
FIG. 6 is a view similar to FIG. 4 but showing two superimposed slabs instead of one.

To obtain realistic technological configurations, in this case the "wall of water" phenomenon will be initiated by producing a dummy tank with a height h constituted by the distance between the top of an upper slab $P_1$ and the bottom of the lower slab $P_2$. This is illustrated in FIG. 6.

In the same way as in the first case, it was possible to assess the efficiencies dependent on the period of the swell, for a device consisting of two superposed slabs 12 m long and 0.24 m thick, immersed in 20 m of water, one 14 m from the seabed and the other 18 m from the seabed, i.e. separated by a distance of 4 m in height from each other.

Figure 7:
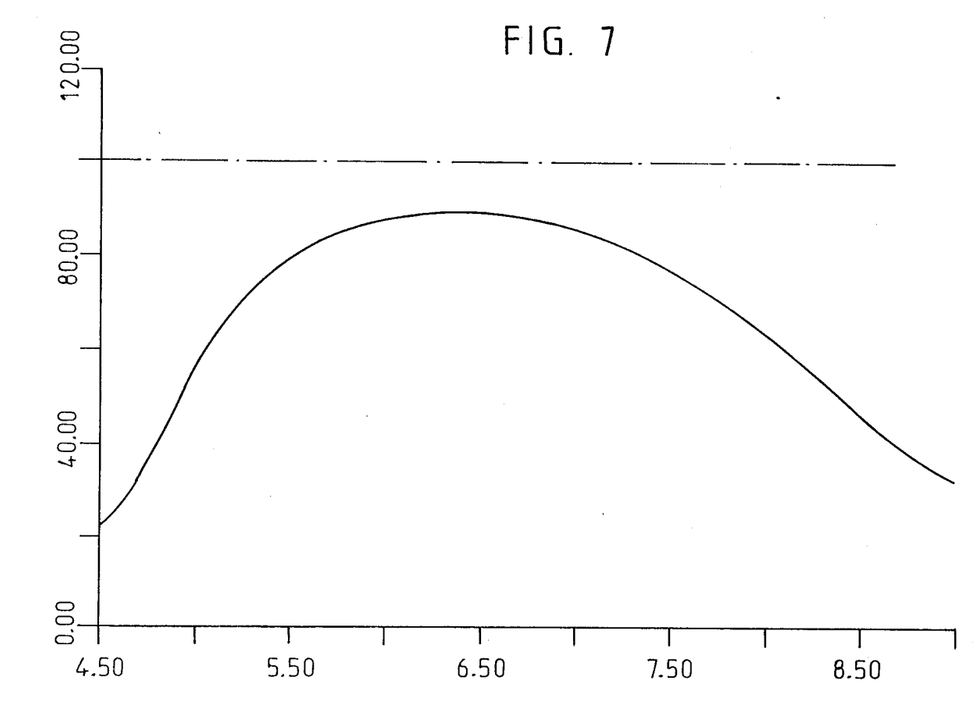
FIG. 7 is a diagrammatic representation similar to that of FIG. 5 but for the arrangement of FIG. 6.

We then obtain the graph shown on FIG. 7, which also indicates a very satisfactory efficiency in a reasonable frequency interval.

Figure 8:
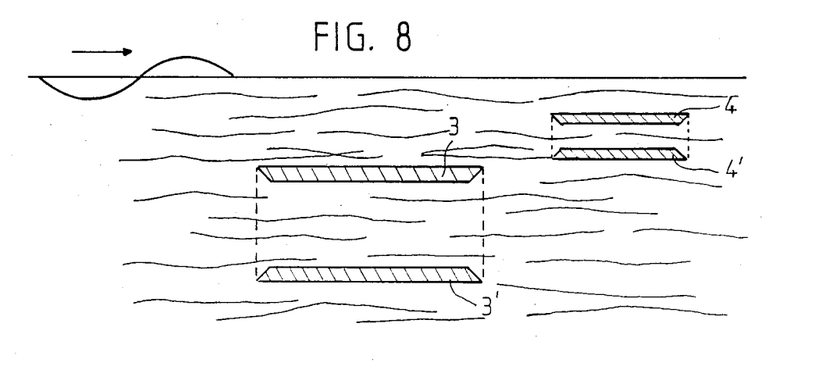
FIG. 8 is a view similar to FIG. 6 but showing two two-slab arrangements situated downstream of one another and at different depths.

Naturally it is both possible and desirable to associate the devices of both types, either serially, i.e. one after the other on the path of the swell, or parallel, i.e. superposed one on the other. This is what is illustrated respectively in FIGS. 8 and 9:

On FIG. 8 the long swell attenuator is placed first, and consists of two slabs 3, 3', whereas the short swell attenuator, consisting of two slabs 4, 4', is then placed and at a depth less than the first.

Figure 9:
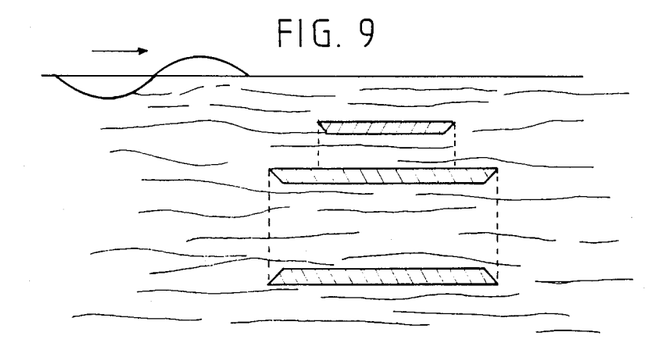
FIG. 9 is a view similar to FIG. 8 but showing a three-slab arrangement.

On the contrary, on FIG. 9, only three superposed slabs are used, i.e. 3, 3', 4', which then operate in parallel.

If we now refer to material implementation, this can take on very varied forms according to:
the depth of the water
the scale of the tide range
the nature of the soil
the characteristics of the incident swells
the performances of the swell attenuator.

The number of the parameters to be taken into consideration to define the attenuator best suited to a given site is therefore very high. This circumstance is not very disadvantageous within the context of the invention, given the fact that the oscillating wall of water is a phenomenon of an undulatory nature that can be easily obtained by calculation, whatever the complexity of the device adopted, as opposed to the previous swell attenuators which took advantage of the damping effects of viscous origin. A complete preliminary design can therefore be conceived from mathematical models which already exist (optimization of hydrodynamic operating, structure design, forces transmitted to the anchorings, etc.). Recourse to experimental tests on small scale models is then only necessary to confirm the validity of the theoretical forecasts before materializing the project.

Figure 10:
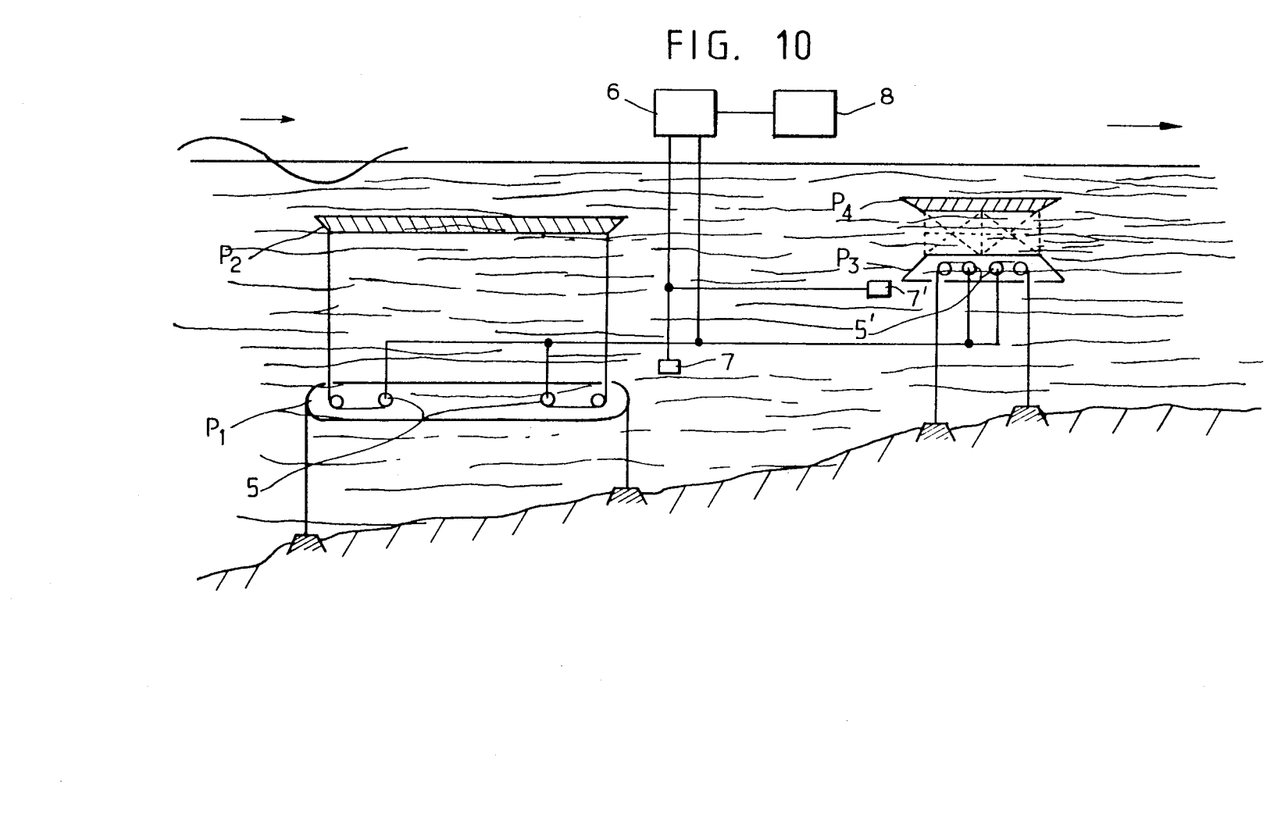
FIG. 10 is a view similar to FIG. 8 but further illustrating adjustable anchoring means for the two two-slab arrangements.

To take an example, a possible configuration has been schematized on FIG. 10 in an especially unfavorable case in which:
the tide range is considerable
the water is very deep
the conditions of the sea can be very severe and following to the nature of the soil it is impossible to take up large scale anchoring forces.

In the case shown which is comparable to that in FIG. 8, the two successive attenuating devices consist of the four following slabs:

| $P_1$ | master slab designed to reduce the dynamic forces transmitted to the anchoring | supported by reels 5 |
|---|---|---|
| $P_2$ | slabs attenuating longs swells, and whose immersion is variable | |
| $P_3$ | double slab attenuating short swells, and whose immersion is variable, supported by reels 5'. | |
| $P_4$ | | |

The cable reels 5 and 5', which optimize the immersion of slab $P_2$ and double slab ($P_3$, $P_4$) only have to develop very low powers if one takes into account the fact that the evolution in the sea conditions is always very slow.

The control of these reels can be more or less sophisticated according as to whether optimization is required contingent on the tide range alone or also on the condition of the sea. In the first case the controls are actuated simply by a pressure pick-up whereas in the second case the controls must be actuated by a microprocessor.

Moreover the control of the reels can also be performed in real time so as to take advantage of the pounding and pitching movements of slab $P_2$ or double slab $P_3$, $P_4$ so as to absorb all or part of the energy of the incident waves; either to recover this energy, or simply to supply the energy required to operate the reels.

As shown in FIG. 10, a control 6 is connected to each of the reels 5 and 5' for raising and lowering the slab $P_2$ and the double slab $P_3$, $P_4$. A pair of pressure pick-ups 7 and 7' are positioned near the slabs $P_1$ and $P_3$ respectively. Based upon the signals generated by the pressure pick-ups 7 and 7', the control 6 senses the depth of the water due to the tides and actuates the reels 5 and 5' accordingly. A microprocessor 8 can be connected to the control 6. The pressure pick-ups 7 and 7', or any equivalent sensors, will generate signals which enable the microprocessor 8 to obtain information on the condition of the sea such as depth, tide range, period of the waves and amplitude of the waves in the vicinity of the slabs. Thus, the microprocessor 8 can then actuate the control 6 which in turn actuates the reels 5 and 5' to vary the depth of at least one of the slabs $P_1$ and $P_3$, $P_4$ depending on the characteristics of the sea.

The example above is naturally simply given as an illustration, and is in no way exhaustive, the invention covering all associations and combinations of the beams creating "oscillating wall of water" with the effect of reducing the consequences of a swell phenomenon, notably, but not exclusively, in the applications listed at the beginning.

Figure 11:
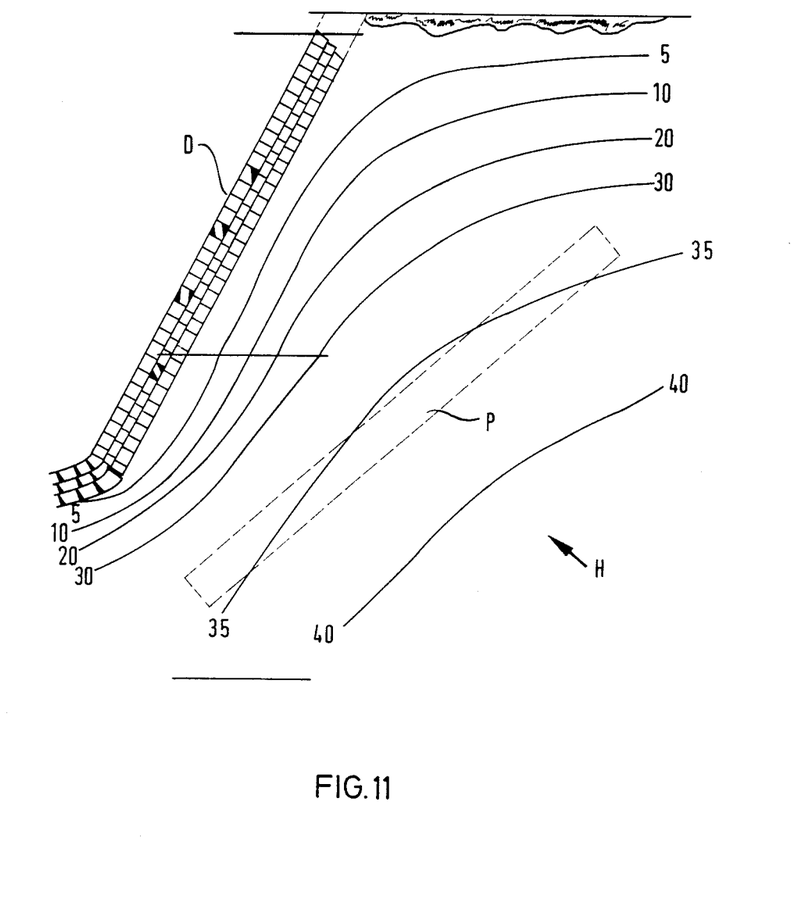
FIG. 11 is a top plane view of a dike to be protected and the adjacent sea region showing the use of the arrangement of the present invention to protect the dike.
Figure 12:
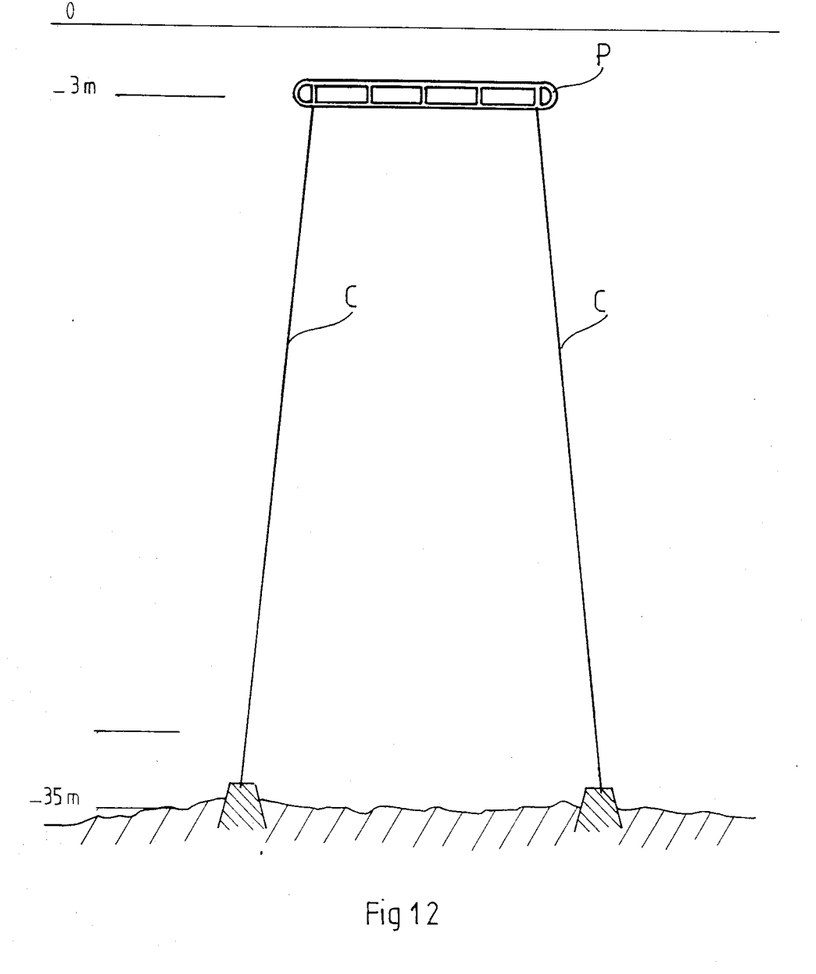
FIG. 12 is a view similar to FIG. 4 but showing the arrangement of FIG. 11 as used in relatively deep water.
Figure 13:
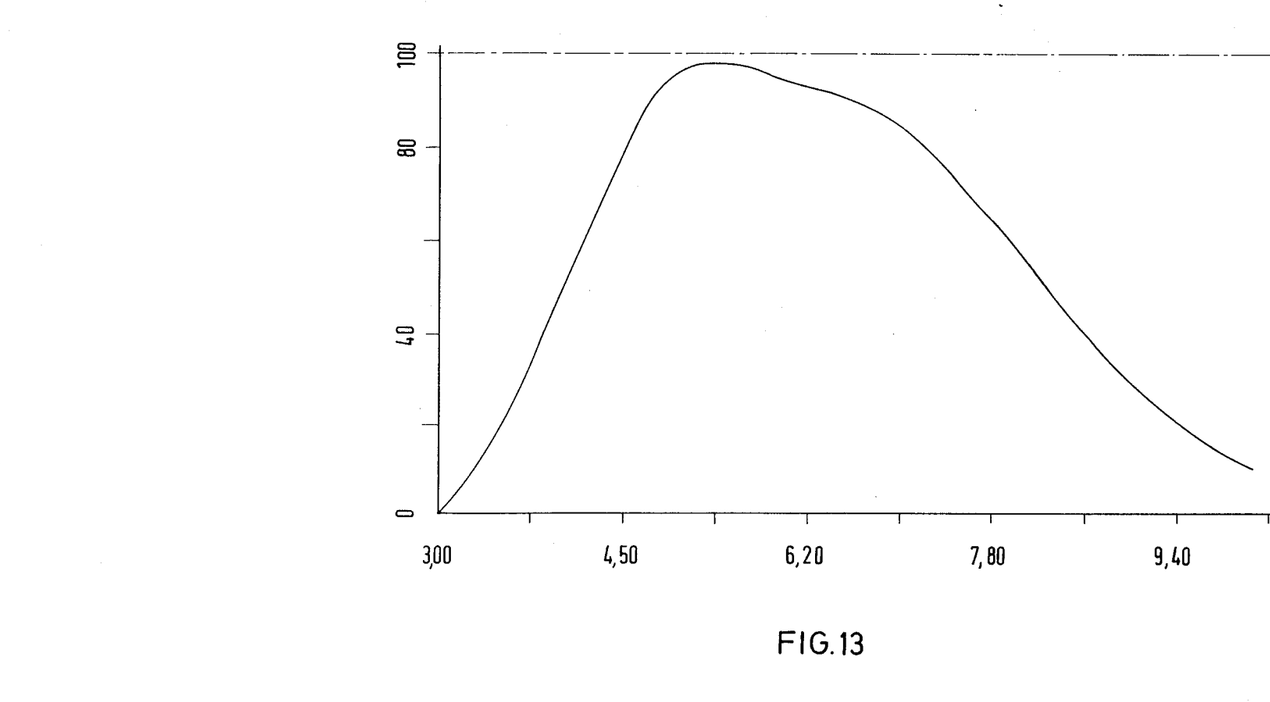
FIG. 13 is a diagrammatic representation similar to that of FIG. 7 but for the arrangement of FIGS. 11 and 12.

Thus FIGS. 11 to 13 illustrate a practical implementation of the invention in its application to the protection of a dyke in bad condition.

FIG. 11 shows schematically the dyke to be protected, indicated by the reference D, and also the isobathic lines at 5, 10, 20, 35 and 40 m, and the direction H of the prevailing swell.

According to the invention this dyke is protected by a slab P 12 m wide and 1.2 m thick, directed perpendicular to the direction H and the immersed at the depth of 3 m above the 35 m seabed, as shown on FIG. 12. The slab has highly positive buoyancy, and is built in rigid and light material covered with a 10 mm thick skin. It is held by cables C secured at 1 m from each end of the slab and moored to the seabed via blocks located at 8 m on either side of the longitudinal axis of the slab. These cables have a stiffness of 10,000 tons per meter with a 10 m cable spacing in the direction parallel to the swell deck.

The efficiency obtained by this system is shown by the graph in FIG. 13 and can be considered as quite satisfactory, i.e. between 80 and 100% for swell periods from 5 to 7 seconds.

It can thus be considered that the dyke D is effectively protected against the effects of swell in the most usual circumstances, through the device according to the invention, whose simplicity is evident.

We claim:

1. A method of attenuating sea swell at wave periods for protecting coastal and offshore structures of installations, comprising in combination:

anchoring at a site at least one water impervious slab to the sea bottom below a free surface of the sea at a distance selected from the free surface to form a wall of water of a given height between itself and the bottom of the sea, maintaining said slab at said given height such that said wall responds to sea swell by oscillating horizontally with a to and fro movement generating diffracted waves and generating a system of radiation waves which combines with said diffracted waves downstream from said wall of water to produce a nil to low amplitude resultant;

and selectively adjusting the spacing of said slab from said sea bottom according to characteristics of said site and of said sea swell so as to at least significantly suppress the waves approaching said slab from the sea side.

2. The method of claim 1, wherein said adjusting is made on the basis of data provided by presence pick-up means or by microprocessors, as regards depth, tide range, period and amplitude of the site.

3. The method of claim 1, comprising forming said wall of water by immersing at least two superimposed slabs at different respective depths and maintaining said slabs at said depths.

4. The method of claim 1, comprising forming horizontally oscillating walls of water by anchoring a first slab to said bottom for reducing dynamic forces, superposing thereover slabs for attenuating long swells and whose immersion is variable and anchoring at a horizontal distance therefrom a double slab for attenuating short swells and whose immersion is variable.

5. The method of claim 1, comprising anchoring at least a slab of highly positive buoyancy, and having dimensions of about 12 meters to the sea bottom by cables at a spacing from the bottom of the sea from about 9.5 meters to about 32.0 meters so that the slab confines between itself and the bottom of the sea a wall of water which oscillates horizontally with such an amplitude at such periods as to at least significantly suppress the waves approaching the immersed slab from the sea side.

6. The method as defined in claim 1, wherein the sea swell attenuation efficiency thereof is defined as (1−energy transmitted/incident energy)×100% whereby at wave periods of said waves approaching the immersed slab from the sea side and ranging between about 5.75 seconds to about 7.00 seconds said sea swell attenuation efficiency is better than about 98%.

7. The method as defined in claim 4, further comprising the step of dimensioning said first slab so as to have a thickness of about 24 centimeters, anchoring said first slab at a distance of about 1.5 meters from a free surface of said body of water, and selecting the depth of said body of water to be about 11 meters.

8. The method as defined in claim 7, wherein a sea swell attenuation efficiency is defined as (1−energy transmitted/incident energy)×100%, and further comprising the steps of anchoring a second slab above the first slab, and so dimensioning said immersed slabs, and placing said slabs at such respective distances below the surface of the sea at a preselected depth of said body of water, whereby at wave periods of said waves approaching the immersed slabs from the sea side, and ranging between about 6.00 seconds to about 7.00 seconds, said sea swell attenuation efficiency is better than about 80%.

9. The method as defined in claim 8, further comprising the steps of dimensioning each of said slabs so that each has a thickness of about 24 centimeters, anchoring the first slab at a distance of about 14 meters from the seabed, and selecting the depth of said body of water to be about 20 meters.

10. The method as defined in claim 5, wherein said off-shore structure includes a dyke, wherein a sea swell attenuation efficiency is defined as (1−energy transmitted/incident energy)×100%, and further comprising the step of dimensioning said slab so as to have a width of about 12 meters along a direction transverse to the approaching waves, and a thickness of about 1.2 meters, anchoring said slab at a distance of about 32 meters above the seabed, and selecting the depth of said body of water to be about 35 meters.

11. The method as defined in claim 10, further comprising the steps of mooring said slab to the seabed by means of a plurality of cables, each of said cables having a stiffness of about 10,000 tons per meter, with rolling movements of said slab being possible, but only insubstantial movements of said slab along vertical directions being possible so that a horizontally oscillating wall of water is formed between said slab and said seabed.

12. An arrangement for attenuating sea swell at a site comprising, in combination, at least one horizontal water impervious slab immersed at a given distance from the surface of the sea, means for securing said slab to said bottom, said slab being thin with respect to its horizontal dimensions, said slab forming a horizontally oscillating wall of water between itself and said sea bottom, said wall having a given height maintained by said slab and generating diffracted waves and a system of radiation waves whose combination with said diffracted waves downstream from said wall of water produce a nill to low amplitude resultant.

13. The arrangement of claim 12, comprising a pair of slabs, a second wall of water being defined therebetween, said slab being immersed at different depths, and cable means securing said slabs to said sea bottom.

14. The arrangement of claim 13, further comprising control means for varying the depth of at least one of said slabs depending on the characteristics of said site as regards the depth and tide range and on the characteristics of a swell including the period and amplitude thereof.

15. The arrangement of claim 14, wherein said control means include pressure pick-ups and microprocessors.

16. The arrangement of claim 12, comprising pairs of horizontally spaced superposed slabs, one of said pairs comprising a master slab for reducing dynamic forces transmitted to said arrangement and secured to the sea bottom and variably immersed slabs above said master slab for attenuating long swells;

an other of said pairs comprising a double slab for attenuating short swells with means variably immersing said double slab above said bottom, said means including reels and means for controlling said reels on the basis of the condition of one of the tide range and the condition of the sea, to vary the depth of immersion of said other pair.

17. The arrangement of claim 16, wherein said means for controlling said reels consist of pressure pick-ups and microprocessors.

18. An arrangement for attenuating sea swell at periods from about 3 seconds to about 10 seconds for protecting coastal or offshore structures or installations, comprising at least one immersed water impervious slab of highly positive buoyancy; anchoring means for anchoring said immersed slab to the sea bottom, said slab having horizontal dimensions of about 12 meters, said anchoring means anchoring said immersed slab at a distance from about 1.5 meters to about 6 meters below the surface of the sea and at about 9.5 meters to about 32.0 meters above the bottom of the sea and forming an oscillating sea wall of a fixed given height oscillating horizontally between said slab and said sea bottom at such an amplitude, phase and at such periods as to at least significantly suppress the waves approaching said immersed slab from the sea side.

19. The arrangement as defined in claim 18, and further comprising at least one additional immersed slab of about the same dimensions as said one immersed slab, and means for securing said additional immersed slab to said one immersed slab at a distance of about 4 meters from said one immersed slab so as to confine between itself and said one immersed slab an additional oscillating sea wall which oscillates horizontally with such an amplitude, phase and at such periods as to enhance the wave-suppression effect of the first-mentioned body of water.

* * * * *